(12) United States Patent
Sato et al.

(10) Patent No.: US 8,275,409 B2
(45) Date of Patent: Sep. 25, 2012

(54) MOBILE DEVICE, MANAGEMENT APPARATUS, PHONE NUMBER MODIFYING SYSTEM, AND CONTROL CIRCUIT

(75) Inventors: Kazuhiro Sato, Kawasaki (JP); Tomoko Satoh, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 431 days.

(21) Appl. No.: 12/656,189

(22) Filed: Jan. 20, 2010

(65) Prior Publication Data

US 2010/0197343 A1    Aug. 5, 2010

Related U.S. Application Data

(63) Continuation of application No. PCT/JP2007/064463, filed on Jul. 23, 2007.

(51) Int. Cl.
*H04M 1/00* (2006.01)

(52) U.S. Cl. ..... 455/551; 455/558; 455/415; 455/414.1; 455/550.1; 455/414.2

(58) Field of Classification Search .......... 455/551, 455/558, 415, 414.1, 550.1
See application file for complete search history.

(56) References Cited

U.S. PATENT DOCUMENTS

2006/0035658 A1* 2/2006 Yoon et al. ............ 455/518
2006/0229063 A1* 10/2006 Koch ................... 455/414.1

FOREIGN PATENT DOCUMENTS

| JP | 4-309049 | 10/1992 |
|----|----------|---------|
| JP | 2001-320755 | 11/2001 |
| JP | 2003-324768 | 11/2003 |
| JP | 2004-297179 | 10/2004 |
| JP | 2005-252741 | 9/2005 |
| JP | 2005-340962 | 12/2005 |
| JP | 2006-129135 | 5/2006 |
| JP | 2007-81774 | 3/2007 |

OTHER PUBLICATIONS

International Search Report for PCT/JP20071064463, mailed on Aug. 28, 2007.

* cited by examiner

*Primary Examiner* — Nghi H Ly
(74) *Attorney, Agent, or Firm* — Staas & Halsey LLP

(57) ABSTRACT

When a mobile device falls within a range in which the mobile device can communicate with an IC tag, the mobile device transmits a phone number acquisition request including an IC tag ID and a device number to a management apparatus. The management apparatus receives the phone number acquisition request, acquires a phone number corresponding to the IC tag ID and the device number included in the phone number acquisition request from a phone number management table, and informs the mobile device of the acquired phone number. The mobile device receives the phone number and modifies its own phone number to the received phone number.

16 Claims, 7 Drawing Sheets

FIG.3

PHONE NUMBER
MANAGEMENT TABLE
121

| IC TAG ID | DEVICE NUMBER | PHONE NUMBER | MAXIMUM NUMBER OF PERMISSIONS | CONTRACTOR NAME |
|---|---|---|---|---|
| 101 | DEVICE FREE | 111-XXXX | 300 | X REAL ESTATE |
| 102 | CCC | 333-3333 | 1 | Y COMPANY |
| 102 | DDD | 444-4444 | 1 | Y COMPANY |
| 102 | EEE | 555-5555 | 1 | Y COMPANY |
| 103 | CCC | 666-6666 | 1 | Y COMPANY |
| ⋮ | ⋮ | ⋮ | ⋮ | ⋮ |

FIG.4

PAY MANAGEMENT
TABLE
122

| IC TAG ID | PHONE NUMBER | ALREADY-PAID FLAG |
|---|---|---|
| 101 | 111-0001 | 1 |
| 101 | 111-0002 | 0 |
| 101 | 111-0003 | 0 |
| 101 | 111-0004 | 1 |
| 101 | 111-0005 | 0 |
| ⋮ | ⋮ | ⋮ |
| 101 | 111-0300 | 0 |
| ⋮ | ⋮ | ⋮ |

FIG.5

BILLING INFORMATION TABLE
123

| PHONE NUMBER | CHARGED AMOUNT |
|---|---|
| 111-0001 | 100 |
| 111-0002 | 2000 |
| 111-0003 | 16 |
| 111-0004 | 30 |
| ⋮ | ⋮ |
| 111-0300 | 5000 |
| 333-3333 | 5500 |
| 444-4444 | 300 |
| 555-5555 | 100 |
| 666-6666 | 100 |
| ⋮ | ⋮ |

FIG.6

CHARGED-AMOUNT-UPPER-LIMIT TABLE
124

| IC TAG ID | CHARGED-AMOUNT UPPER LIMIT |
|---|---|
| 101 | 300000 |
| 102 | 6000 |
| 103 | - |
| ⋮ | ⋮ |

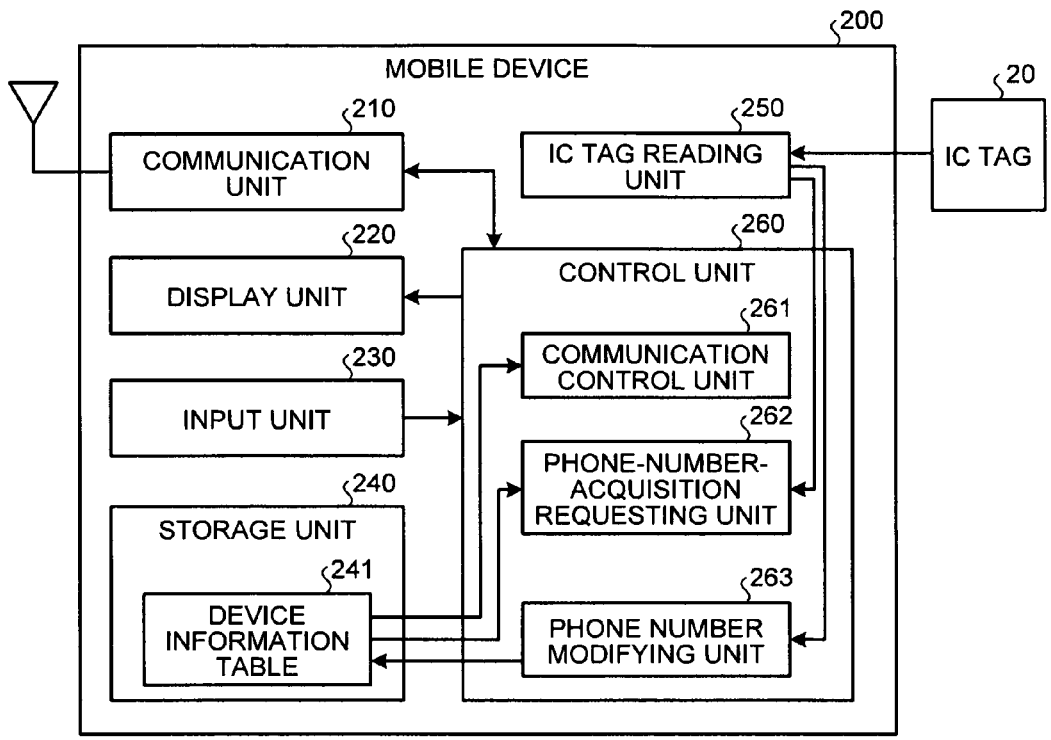

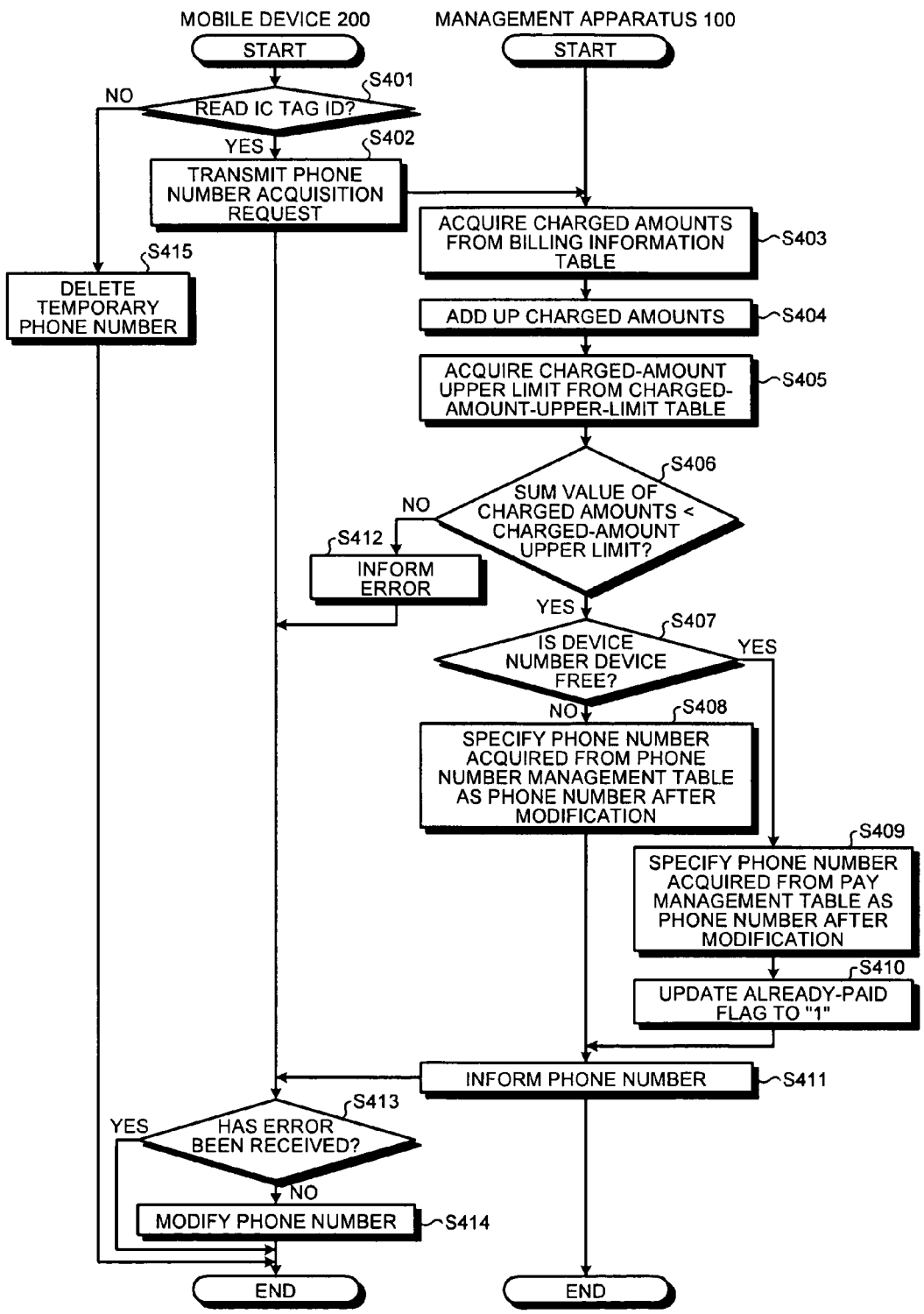

MOBILE DEVICE, MANAGEMENT APPARATUS, PHONE NUMBER MODIFYING SYSTEM, AND CONTROL CIRCUIT

CROSS-REFERENCE TO RELATED APPLICATION(S)

This application is a continuation of International Application No. PCT/JP2007/064463, filed on Jul. 23, 2007, the entire contents of which are incorporated herein by reference.

FIELD

The embodiment discussed herein is directed to a mobile device, a management apparatus that can communicate with the mobile device, a phone number modifying system including the mobile device and the management apparatus, and a control circuit that controls the mobile device.

BACKGROUND

A conventional art making it possible to use a plurality of phone numbers in one mobile device is known. For example, Japanese Laid-open Patent Publication No. 2005-340962 discloses a technology making it possible to use a plurality of phone numbers in one mobile device, in which the mobile device transmits terminal information and additional information of specifying the mobile device to a predetermined apparatus when the mobile device performs call origination and the predetermined apparatus performs a call request on a communications partner based on the terminal information and additional information.

Japanese Laid-open Patent Publication No. 2001-320755 discloses a technology in which a mobile device, which has a public cellular telephone function and an owned-operated cordless telephone function, receives an owned-operated area identifier of specifying an owned-operated network service area from an IC (Integrated Circuit) tag provided in the owned-operated network service area and then modifies its own phone number to a phone number corresponding to the received owned-operated area identifier with reference to an association table of owned-operated area identifiers and phone numbers previously stored in the mobile device.

The conventional arts have a problem in that a phone number to be modified should be previously set in a mobile device. In other words, when a different phone number is newly used for a mobile device, this new phone number must be set in the mobile device.

For example, when a company officially announces different phone numbers for each company department to customers, the company requires a work of causing the owner of a mobile device to register a new phone number in the mobile device or a work of collecting a mobile device from an owner to register a new phone number in the mobile device and returning the mobile device to the owner whenever the number of departments is increased or the phone number is changed.

Particularly, a company where many company employees together use phone numbers for personal and company use or a company where employee movement is frequently performed requires an enormous amount of man-hours to perform this kind of complicated work many times while carrying out thorough registration omission prevention.

Therefore, when a plurality of phone numbers is used in one mobile device, the important problem is realizing a technology for easily modifying a phone number to another phone number without previously setting the other phone number in the mobile device.

SUMMARY

According to an aspect of an embodiment of the invention, a phone number modifying system includes a mobile device that stores a device number for uniquely identifying the mobile device; and a management apparatus that can communicate with the mobile device. The mobile device includes a device information storage unit that previously stores a phone number; a communication control unit that performs communication control by using the phone number stored in the device information storage unit; an IC tag reading unit that reads an identification number for uniquely identifying an IC tag from the IC tag; a phone-number-acquisition requesting unit that transmits a phone number acquisition request including the identification number read by the IC tag reading unit and the device number of the mobile device to the management apparatus; and a phone number modifying unit that modifies the phone number stored in the device information storage unit to a phone number after modification included in modification information received as a response to the phone number acquisition request. The management apparatus includes a phone number management storage unit that previously stores a phone number after modification in association with a combination of the identification number and the device number; a phone number specifying unit that specifies, when receiving the phone number acquisition request from the mobile device, a phone number after modification corresponding to the combination of the identification number and the device number included in the phone number acquisition request from the phone number management storage unit; and a phone number informing unit that informs the mobile device of modification information including the phone number after modification specified by the phone number specifying unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3 is a diagram illustrating an example of a phone number management table;

FIG. 4 is a diagram illustrating an example of a pay management table;

FIG. 5 is a diagram illustrating an example of a billing information table;

FIG. 6 is a diagram illustrating an example of a charged-amount-upper-limit table;

FIG. 7 is a functional block diagram illustrating the configuration of a mobile device according to the embodiment of the present invention;

FIG. 8 is a diagram illustrating an example of a device information table;

FIG. 9 is a diagram illustrating a control sequence between the management apparatus and the mobile device related to a phone number modification process according to the embodiment of the present invention;

DESCRIPTION OF EMBODIMENT

Preferred embodiments of the present invention will be explained with reference to accompanying drawings. The present invention is not limited to the embodiments explained below.

First, it will be explained about the brief of a phone number modifying system according to the embodiment of the present invention. The phone number modifying system according to the embodiment of the present invention includes a mobile device that can modify a phone number, a management apparatus that manages the phone number of the mobile device, and a noncontact IC tag. When the mobile device falls within a range in which the mobile device can communicate with the IC tag, the mobile device transmits a phone number acquisition request, which includes an identification number (hereinafter, "IC tag ID") of uniquely specifying the IC tag and a device number for uniquely identifying the mobile device, to the management apparatus.

The management apparatus stores therein phone numbers in association with the combination of IC tag IDs and device numbers. When receiving the phone number acquisition request from the mobile device, the management apparatus specifies a phone number that corresponds to the combination of the IC tag ID and the device number included in the phone number acquisition request as a phone number after modification and informs the mobile device of modification information including the specified phone number. The mobile device receives the modification information and modifies the present phone number to the phone number included in the modification information.

Figure 1:
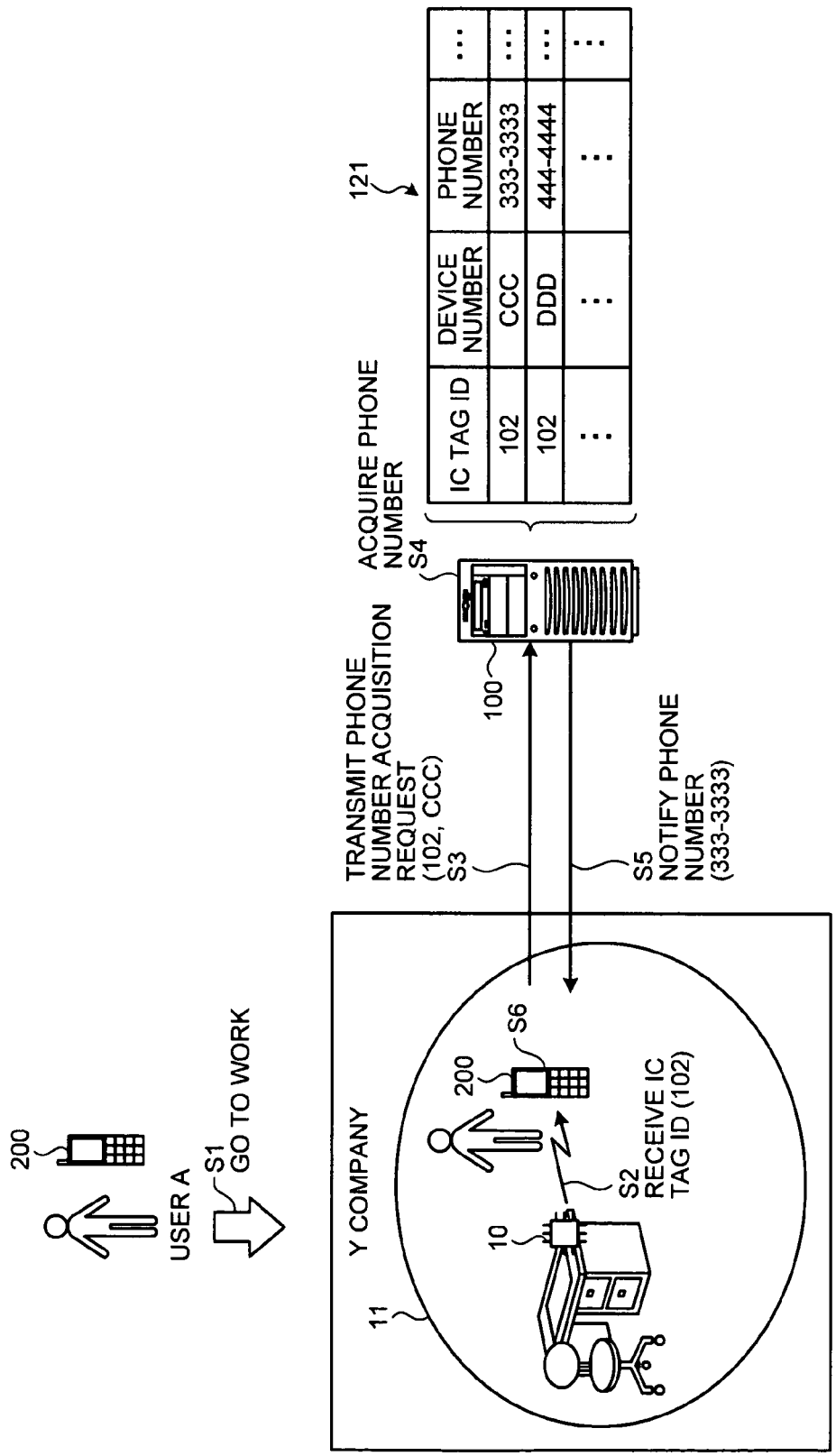
FIG. 1 is an explanation diagram explaining the brief of a phone number modifying system according to an embodiment of the present invention.

The embodiment of the present invention will be specifically explained with reference to FIG. 1. FIG. 1 is an explanation diagram explaining the brief of the phone number modifying system according to the embodiment of the present invention. As illustrated in FIG. 1, a user A owns a mobile device 200. In this case, it is assumed that the user A utilizes the mobile device 200 by using "000-0000" as an individual phone number.

When the user A goes to work to a company Y (Step S1) and the mobile device 200 falls within a range 11 in which the mobile device can communicate with an IC tag 10 provided in the company Y, the mobile device 200 receives an IC tag ID from the IC tag 10 (Step S2). In this case, it is assumed that the IC tag ID of the IC tag 10 is "102".

Then, the mobile device 200 transmits a phone number acquisition request including the received IC tag ID "102" and the device number of the mobile device 200 to a management apparatus 100 (Step S3). In this case, it is assumed that the device number of the mobile device 200 is "CCC".

The management apparatus 100 receives the phone number acquisition request and acquires a phone number corresponding to the combination of the IC tag ID and the device number included in the phone number acquisition request from a phone number management table 121 that stores phone numbers in association with the combination of IC tag IDs and device numbers (Step S4). For example, like the first line of the phone number management table 121 illustrated in FIG. 1, if "333-3333" is registered as the phone number corresponding to the combination of the IC tag ID "102" and the device number "CCC", the management apparatus 100 acquires "333-3333" as the phone number.

Then, the management apparatus 100 informs the mobile device 200 of modification information including the acquired phone number "333-3333" (Step S5). The mobile device 200 receives the modification information and modifies the phone number "000-0000" of the mobile device 200 to the phone number "333-3333" included in the modification information (Step S6). After that, the mobile device 200 performs communication by using the modified phone number "333-3333".

Then, when the user A takes the mobile device 200 outside the range 11 in which the mobile device can communicate with the IC tag 10, the phone number of the mobile device 200 returns to the individual phone number "000-0000". Alternatively, the phone number modifying system can be configured to provide an IC tag at the exit of a company and return to an individual phone number when the mobile device 200 falls within a range in which the mobile device can communicate with the IC tag, or can be configured to return to an individual phone number when the user A performs a predetermined operation on the mobile device 200.

In this manner, because a phone number to be modified is managed on the management apparatus 100 by utilizing the phone number modifying system according to the embodiment of the present invention, it is not necessary to previously set a phone number to be modified in the mobile device 200. Therefore, when a different phone number is newly used, it is not necessary to set a new phone number in the mobile device 200.

For example, whenever the number of departments is increased or the phone numbers are modified in a company that announces officially different phone numbers for departments to customers, it is not necessary to perform a work of causing the owner of a mobile device to register a new phone number in the mobile device or a work of collecting a mobile device from an owner to register a new phone number in the mobile device and returning the mobile device to the owner.

In FIG. 1, if a phone number corresponding to the combination of an IC tag ID and a device number is stored in the phone number management table 121, the example in which the phone number of the mobile device 200 can be modified to the corresponding phone number is explained. However, by utilizing the phone number modifying system according to the embodiment of the present invention, the phone number of the mobile device 200 can be modified regardless of the device number of the mobile device 200 if the IC tag ID included in the phone number acquisition request is identical with the IC tag ID stored in the phone number management table 121.

Hereinafter, for convenience of explanation, what the phone number of the mobile device 200 can be modified if a phone number corresponding to the combination of an IC tag ID and a device number is stored in the phone number management table 121 is described as "device fixation". Moreover, regardless of a device number, what the phone number of the mobile device 200 can be modified if a phone number corresponding to an IC tag ID is stored in the phone number management table 121 is described as "device free".

Figure 2:
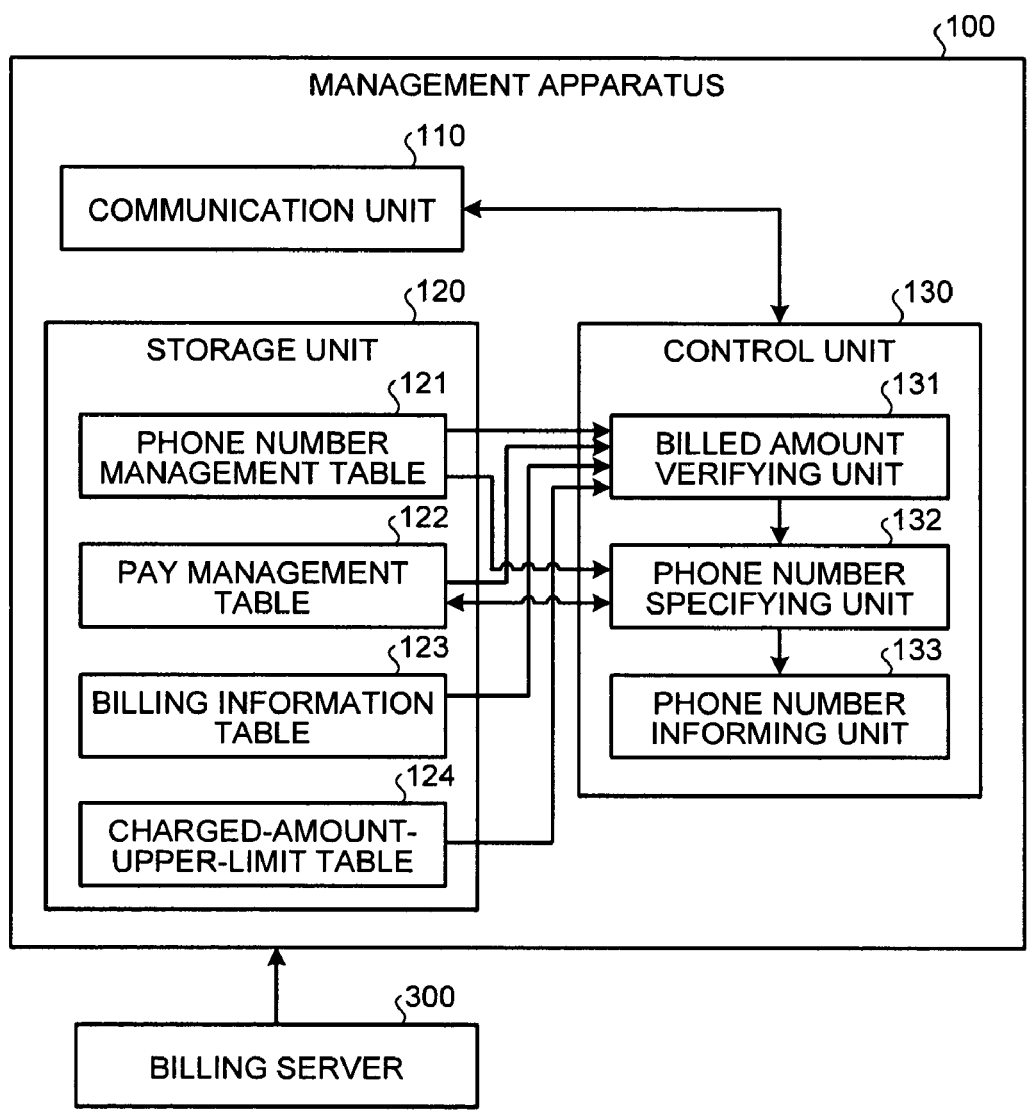
FIG. 2 is a functional block diagram illustrating the configuration of a management apparatus according to the embodiment of the present invention.

Next, it will be explained about the configuration of the management apparatus according to the embodiment of the present invention. FIG. 2 is a functional block diagram illustrating the configuration of the management apparatus according to the embodiment of the present invention. As illustrated in FIG. 2, the management apparatus 100 includes a communication unit 110, a storage unit 120, and a control unit 130.

The communication unit 110 is a function part that performs communication control of data communication through a base station not illustrated. For example, when a phone number acquisition request is transmitted from the mobile device 200, the communication unit 110 receives the phone number acquisition request and outputs the request to a billed amount verifying unit 131 and a phone number specifying unit 132 to be described below.

The storage unit 120 is a storage device that includes a magnetic disk apparatus and the like, and stores therein the phone number management table 121, a pay management table 122, a billing information table 123, and a charged-amount-upper-limit table 124.

FIG. 3 is a diagram illustrating an example of the phone number management table 121. As illustrated in FIG. 3, the phone number management table 121 saves phone numbers, the maximum number of permissions, and contractor names in association with the combination of IC tag IDs and device numbers.

An IC tag ID is an identification number for uniquely identifying an IC tag provided at a predetermined place. A device number is a number (for example, serial number) of uniquely specifying a mobile device that utilizes the phone number modifying system according to the embodiment of the present invention in the case of "device fixation" and is a flag, a character string, or the like that can determine that a mobile device is "device free" without setting a serial number in the case of "device free". In an example illustrated in FIG. 3, the IC tag in which an IC tag ID "101" is stored is "device free" and a value indicative of "device free" is set in a device number corresponding to the IC tag ID "101".

A phone number is a number to be notified to the mobile device 200. However, when the value of a device number is "device free", a phone number to be notified to the mobile device 200 is set in the pay management table 122 to be described below.

The maximum number of permissions is the number of phone numbers that can be assigned by the corresponding IC tag ID. The maximum number of permissions is set to "1" when the value of a device number is not "device free". A contractor name is a title such as the name of a contractor or a company that utilizes the phone number modifying system according to the embodiment of the present invention.

FIG. 4 is a diagram illustrating an example of the pay management table 122. As illustrated in FIG. 4, the pay management table 122 saves phone numbers and already-paid flags in association with IC tag IDs. The IC tag IDs are identification numbers of uniquely specifying IC tags and respectively correspond to the IC tag IDs of the phone number management table 121.

The field of phone number contains phone numbers corresponding to the number stored in the field of the maximum number of permissions of the phone number management table 121 when the value of device number corresponding to the IC tag ID in the phone number management table 121 is "device free". When the device number stored in the phone number management table 121 is "device free", the phone numbers stored in the pay management table 122 become a candidate of a phone number to be notified to the mobile device 200.

An already-paid flag is data indicative of whether the corresponding phone number is used in a certain mobile device when the phone number is notified to the mobile device. By using the already-paid flag, the phone number modifying system can prevent to inform different mobile devices of the same phone number. In this case, the already-paid flag is "1" when the corresponding phone number is used and the already-paid flag is "0" when the corresponding phone number is not used.

FIG. 5 is a diagram illustrating an example of the billing information table 123. As illustrated in FIG. 5, the billing information table 123 saves charged amounts in association with phone numbers. The phone numbers respectively correspond to the phone numbers of the phone number management table 121 or the phone numbers of the pay management table 122. The fields of charged amount contain call charges to be requested for the corresponding phone numbers.

The billing information table 123 saves phone numbers and call charges acquired from the billing server 300 that manages for each phone number a call charge determined based on a communication charge or an internet connection time determined based on duration of a call. In addition, when modifying the phone number of the mobile device 200 by using the phone number modifying system according to the embodiment of the present invention, the call charge is not charged to an owner that uses the mobile device 200, but is charged to the installation personnel of the IC tag.

FIG. 6 is a diagram illustrating an example of the charged-amount-upper-limit table 124. As illustrated in FIG. 6, the charged-amount-upper-limit table 124 saves charged-amount upper limits in association with IC tag IDs. The IC tag IDs respectively correspond to the IC tag IDs of the phone number management table 121.

The charged-amount upper limit is an upper-limit money amount of the call charge for one month capable of performing communication by using the phone number corresponding to the associated IC tag ID. When a call charge of the phone number corresponding to the IC tag exceeds a charged-amount upper limit, the installation personnel of the IC tag can prevent the modification of the phone number by the IC tag by setting the charged-amount upper limit.

The description is about the case where a charged-amount upper limit is set for each IC tag ID. However, the present invention can have a configuration that a charged-amount upper limit is set for each contractor name, or can have a configuration that a charged-amount upper limit is set for each phone number or device number. In an example of FIG. 6, the charged-amount upper limit corresponding to the IC tag ID "101" is "300000 yen" and the charged-amount upper limit corresponding to the IC tag ID "103" is not set. Moreover, the description is about the case where a charged-amount upper limit is an upper-limit money amount of the call charge for one month. However, the period can be any period such as three month or one year.

The control unit 130 is a control unit that controls the entire of the management apparatus 100, and includes the billed amount verifying unit 131, the phone number specifying unit 132, and a phone number informing unit 133.

When receiving a phone number acquisition request from the mobile device 200, the billed amount verifying unit 131 acquires a device number and a phone number corresponding to an IC tag ID included in the phone number acquisition request from the phone number management table 121. When the acquired device number corresponds to "device free", because a phone number is not set in the field of the phone number of the phone number management table 121, the phone number corresponding to the IC tag ID included in the phone number acquisition request is acquired from the pay management table 122.

Then, the billed amount verifying unit 131 acquires charged amounts corresponding to the phone numbers acquired from the phone number management table 121 or the pay management table 122 from the billing information table 123, and adds up the acquired all charged amounts. Then, the billed amount verifying unit 131 acquires a charged-amount upper limit corresponding to the IC tag ID included in the phone number acquisition request from the charged-amount-upper-limit table 124, and compares the sum value of the charged amounts and the charged-amount upper limit.

When the sum value of the charged amounts is smaller than the charged-amount upper limit, the billed amount verifying unit 131 instructs the phone number specifying unit 132 to specify a phone number after modification to be notified to the mobile device 200. On the other hand, when the sum value of the charged amounts is larger than the charged-amount upper limit, the billed amount verifying unit 131 transmits, for example, an error message that "an phone number cannot be modified because a call charge exceeds a charged-amount upper limit" to the mobile device 200 via the communication unit 110.

When the billed amount verifying unit 131 verifies that the sum value of the charged amounts is smaller than the charged-amount upper limit, the phone number specifying unit 132 acquires a device number and a phone number corresponding to the IC tag ID included in the phone number acquisition request from the phone number management table 121.

When the acquired device number is identical with the identification number included in the phone number acquisition request, the phone number specifying unit 132 specifies a phone number corresponding to the identical device number as a phone number after modification and outputs the phone number to the phone number informing unit 133.

On the other hand, when the acquired device number is "device free", the phone number specifying unit 132 acquires one phone number that corresponds to the IC tag ID included in the phone number acquisition request and corresponds to the already-paid flag "0" (unpaid) from the pay management table 122, and specifies the acquired phone number as a phone number after modification and outputs the phone number to the phone number informing unit 133. Then, the phone number specifying unit 132 updates the already-paid flag of the pay management table 122 corresponding to the acquired phone number to "1" (paid).

When receiving the phone number from the phone number specifying unit 132, the phone number informing unit 133 is a function part that informs the mobile device 200 of modification information including the received phone number.

It will be explained about the process of the billed amount verifying unit 131 and the phone number specifying unit 132 described above by using two examples. As illustrated in FIGS. 3 to 6, it is assumed that data are stored in the phone number management table 121, the pay management table 122, the billing information table 123, and the charged-amount-upper-limit table 124.

First, it will be explained about the process of the billed amount verifying unit 131 and the phone number specifying unit 132 when the IC tag ID included in the phone number acquisition request is "102" and the device number is "CCC".

The billed amount verifying unit 131 acquires "CCC, 333-3333", "DDD, 444-4444", and "EEE, 555-5555" as the combinations of device numbers and phone numbers corresponding to the IC tag ID "102" from the phone number management table 121.

Because the acquired device number is not "device free", the billed amount verifying unit 131 acquires charged amounts corresponding to the acquired phone numbers from the billing information table 123. As illustrated in FIG. 5, "5500", "300", and "100" are acquired as the charged amounts corresponding to the phone numbers "333-3333", "444-4444", and "555-5555", and these charged amounts are added up. The sum value becomes "5900".

Then, the billed amount verifying unit 131 acquires "6000" as a charged-amount upper limit corresponding to the IC tag ID "102" from the charged-amount-upper-limit table 124, and compares the sum value "5900" of the charged amounts and the charged-amount upper limit "6000". Because the sum value of the charged amounts is smaller than the charged-amount upper limit, the billed amount verifying unit 131 instructs the phone number specifying unit 132 to specify a phone number after modification to be notified to the mobile device 200.

The phone number specifying unit 132 receives the instruction, and acquires "CCC, 333-3333", "DDD, 444-4444", and "EEE, 555-5555" as the combinations of device numbers and phone numbers corresponding to the IC tag ID "102" from the phone number management table 121.

The phone number specifying unit 132 specifies the phone number "333-3333" for which the acquired device number and the identification number "CCC" included in the phone number acquisition request are identical to each other as a phone number after modification to be notified to the mobile device 200, and outputs the specified phone number "333-3333" to the phone number informing unit 133.

Next, it will be explained about the process of the billed amount verifying unit 131 and the phone number specifying unit 132 when the IC tag ID included in the phone number acquisition request is "101" and the device number is "GGG."

The billed amount verifying unit 131 acquires "device free, 111-XXXX" as the combination of device number and phone number corresponding to the IC tag ID "101" from the phone number management table 121.

Because the acquired device number is "device free", the billed amount verifying unit 131 acquires "111-0001", "111-0002", . . . , and "111-0300" as the phone numbers corresponding to the IC tag ID "101" from the pay management table 122.

Then, the billed amount verifying unit 131 acquires "100", "2000", "16", "30", . . . , and "5000" as the charged amounts corresponding to the acquired phone numbers from the billing information table 123, and adds up these charged amounts. In this case, it is assumed that the sum value is "9046".

Then, the billed amount verifying unit 131 acquires "300000" as the charged-amount upper limit corresponding to the IC tag ID "101" from the charged-amount-upper-limit table 124 and compares the sum value "9046" of the charged amounts and the charged-amount upper limit "300000". Because the sum value of the charged amounts is smaller than the charged-amount upper limit, the billed amount verifying unit 131 instructs the phone number specifying unit 132 to specify a phone number after modification to be notified to the mobile device 200.

The phone number specifying unit 132 receives the instruction, acquires "111-0002" as a phone number that corresponds to the IC tag ID "101" and the already-paid flag is "0" (unpaid) from the pay management table 122, specifies the phone number "111-0002" as a phone number after modification to be notified to the mobile device 200, and outputs the specified phone number "111-0002" to the phone number informing unit 133.

Then, the phone number specifying unit 132 updates the already-paid flag of the pay management table 122 corresponding to the phone number "111-0002" to "1" (paid). In addition, the phone number acquired from the pay management table 122 can be any phone number if the phone number corresponds to the IC tag ID "101" and the already-paid flag "0" (unpaid).

Next, it will be explained about the configuration of the mobile device according to the embodiment of the present invention. FIG. 7 is a functional block diagram illustrating the configuration of the mobile device according to the embodiment of the present invention. As illustrated in FIG. 7, the mobile device 200 includes a communication unit 210, a display unit 220, an input unit 230, a storage unit 240, an IC tag reading unit 250, and a control unit 260.

The communication unit 210 is a function part that performs communication control of audio communication and data communication through a base station not illustrated. The display unit 220 is a display device that includes a liquid crystal panel and the like. The input unit 230 is an input device that includes a ten-key pad for inputting numbers and characters, a call button for performing a call, and the like.

The storage unit 240 is a storage device that includes a nonvolatile memory such as a flash memory, and stores a device information table 241. FIG. 8 is a diagram illustrating an example of the device information table 241. As illustrated in FIG. 8, the device information table 241 saves a device number, a basic phone number, and a temporary phone number.

The device number is a number for uniquely specifying the mobile device 200, and is, for example, a serial number or the like of the mobile device 200. The information stored in the field of the device number can be any number if the number can uniquely specify the mobile device 200.

The basic phone number is a phone number that is initialized at the time of the purchase of the mobile device 200 and is not modified. For example, the basic phone number is an individual phone number. When the phone number is not set to the temporary phone number, the mobile device 200 communicates with other mobile devices by using the phone number stored in the field of the basic phone number.

The temporary phone number is set to a phone number included in modification information when the modification information is notified from the management apparatus 100. When a phone number is set in the temporary phone number, the mobile device 200 performs communications by using the phone number stored in the field of temporary phone number.

When the mobile device 200 falls within a range in which the mobile device can communicate with an IC tag 20, the IC tag reading unit 250 reads an IC tag ID from the IC tag 20 and outputs the read IC tag ID to a phone-number-acquisition requesting unit 262 and a phone number modifying unit 263.

The control unit 260 controls the whole of the mobile device 200. For example, the control unit 260 performs a call control for communicating with another telephone, an electronic mail control for transmitting and receiving electronic mails, a Web control for browsing a Web page via Internet, and the like.

The control unit 260 includes a communication control unit 261, the phone-number-acquisition requesting unit 262, and the phone number modifying unit 263. The communication control unit 261 is a processing unit that performs a call connection process such as a call connection through a base station and a telephone switching network. For example, when the phone number of a call partner is input via the input unit 230 and a call button is clicked, the communication control unit 261 performs a call originating request on the communication unit 210 to establish a call by sending signals to a terminal device (mobile device or fixed-line phone) corresponding to the input phone number.

At this time, when a phone number is stored in the field of the temporary phone number of the device information table 241, the phone number stored in the temporary phone number is included in the call originating request as a source phone number by the communication control unit 261. On the other hand, when a phone number is not stored in the temporary phone number, the phone number stored in the basic phone number is included in the call originating request as a source phone number by the communication control unit 261.

When receiving an IC tag ID from the IC tag reading unit 250, the phone-number-acquisition requesting unit 262 is a function part that acquires a device number from the device information table 241 and transmits a phone number acquisition request including the IC tag ID and the device number to the management apparatus 100.

The phone number modifying unit 263 is a function part that modifies a temporary phone number stored in the device information table 241. Specifically, when receiving modification information including a phone number from the management apparatus 100, the phone number modifying unit 263 modifies the temporary phone number of the device information table 241 to the phone number included in the received modification information.

When not receiving an IC tag ID from the IC tag reading unit 250 for a certain period (for example, five minutes), the phone number modifying unit 263 deletes the phone number stored in the field of the temporary phone number. In this way, when a user takes the mobile device 200 outside a range in which the mobile device can communicate with the IC tag 20, the phone number of the mobile device 200 is modified to the phone number stored in the field of the basic phone number.

When not receiving an IC tag ID from the IC tag reading unit 250 for a certain period, the phone number modifying unit 263 can delete the phone number stored in the field of the temporary phone number and transmit the deleted phone number to the management apparatus 100. The management apparatus 100 receives the phone number, and updates the already-paid flag of the pay management table 122 to "0" (unpaid) when the phone number is device free. In this way, a phone number that has not been used can be reused.

Next, it will be explained about a phone number modification process performed by the management apparatus 100 illustrated in FIG. 2 and the mobile device 200 illustrated in FIG. 7. FIG. 9 is a diagram illustrating a control sequence between the management apparatus 100 and the mobile device 200 related to the phone number modification process according to the embodiment of the present invention.

As illustrated in FIG. 9, when the IC tag reading unit 250 of the mobile device 200 reads an IC tag ID from the IC tag (Step S401: YES), the phone-number-acquisition requesting unit 262 transmits a phone number acquisition request including the IC tag ID and the device number stored in the device information table 241 to the management apparatus 100 (Step S402).

On the other hand, when the IC tag reading unit 250 of the mobile device 200 does not read an IC tag ID from the IC tag for a certain period and does not input the IC tag ID into the phone number modifying unit 263 (Step S401: NO), the phone number modifying unit 263 deletes the phone number stored in the temporary phone number of the device information table 241 (Step S415).

The billed amount verifying unit 131 of the management apparatus 100 receives the phone number acquisition request, acquires phone numbers corresponding to the IC tag ID included in the phone number acquisition request from the phone number management table 121 or the pay management table 122, acquires charged amounts corresponding to the acquired phone numbers from the billing information table 123 (Step S403), and adds up the acquired all charged amounts (Step S404).

Then, the billed amount verifying unit 131 acquires a charged-amount upper limit corresponding to the IC tag ID included in the phone number acquisition request from the charged-amount-upper-limit table 124 (Step S405), and compares the sum value of the charged amounts and the charged-amount upper limit (Step S406).

When the sum value of the charged amounts is smaller than the charged-amount upper limit (Step S406: YES), the billed amount verifying unit 131 instructs the phone number specifying unit 132 to specify a phone number after modification to be notified to the mobile device 200.

The phone number specifying unit 132 receives the instruction, and acquires a device number and a phone number corresponding to the IC tag ID included in the phone number acquisition request from the phone number management table 121. If the acquired device number is not "device free" (Step S407: NO), the phone number specifying unit 132 specifies, when the device number acquired from the phone number management table 121 is identical with the device number included in the phone number acquisition request, the phone number corresponding to the identical device number as a phone number after modification and outputs the specified phone number to the phone number informing unit 133 (Step S408).

On the other hand, when the device number acquired from the phone number management table 121 is "device free" (Step S407: YES), the phone number specifying unit 132 acquires one phone number that corresponds to the IC tag ID included in the phone number acquisition request and corresponds to an already-paid flag of "0" (unpaid) from the pay management table 122, specifies the acquired phone number as a phone number after modification, outputs the specified phone number to the phone number informing unit 133 (Step S409), and updates the already-paid flag of the pay management table 122 corresponding to the acquired phone number to "1" (paid) (Step S410).

The phone number informing unit 133 receives the phone number from the phone number specifying unit 132, and informs the mobile device 200 of modification information including the received phone number (Step S411).

On the other hand, when the sum value of the charged amounts is larger than or is equal to the charged-amount upper limit (Step S406: NO), the phone number specifying unit 132 transmits an error message to the mobile device 200 (Step S412).

When not receiving the error message and receiving the modification information from the management apparatus 100 (Step S413: NO), the phone number modifying unit 263 of the mobile device 200 modifies the temporary phone number of the device information table 241 to the phone number included in the modification information (Step S414).

As described above, according to the present embodiment, when the mobile device 200 falls within a range in which the mobile device can communicate with an IC tag, the IC tag reading unit 250 reads an IC tag ID from the IC tag, the phone-number-acquisition requesting unit 262 transmits a phone number acquisition request including the IC tag ID and the device number to the management apparatus 100, the phone number specifying unit 132 of the management apparatus 100 receives the phone number acquisition request and acquires a phone number from the phone number management table 121 or the pay management table 122 on the basis of the IC tag ID and the device number included in the phone number acquisition request, the phone number informing unit 133 informs the mobile device 200 of modification information including the acquired phone number, and the phone number modifying unit 263 of the mobile device 200 receives the modification information and modifies the temporary phone number of the device information table 241 to the phone number included in the modification information. Therefore, the phone number of the mobile device 200 can be easily modified to a phone number that is not previously set in the mobile device 200. In this way, when a different phone number is newly used, it is not necessary to set a new phone number in the mobile device 200.

Figure 10:
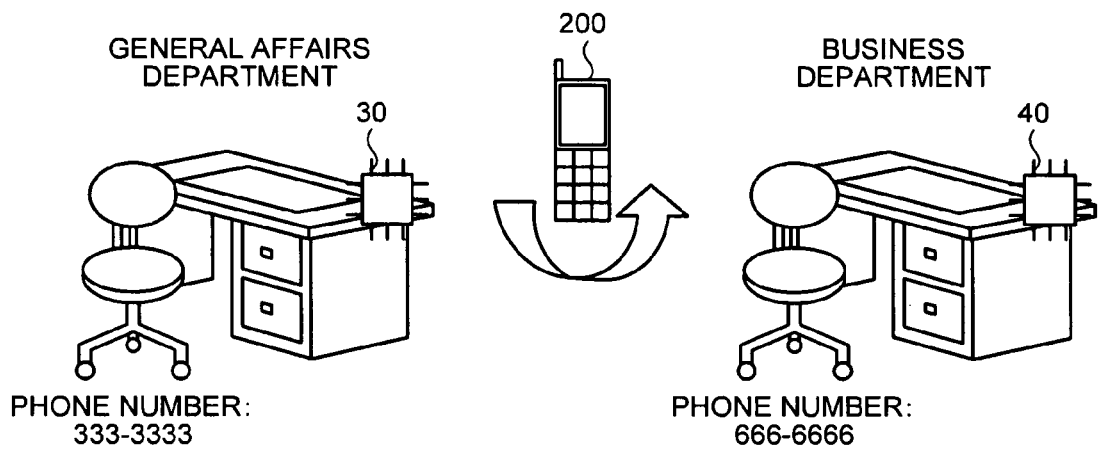
FIG. 10 is an explanation diagram explaining an example of modifying a phone number in a company.

Next, it will be explained about an application example of the phone number modifying system according to the embodiment of the present invention with reference to FIGS. 10 and 11. FIG. 10 is an explanation diagram explaining an example for modifying a phone number within a company. As illustrated in FIG. 10, an IC tag 30 in which the IC tag ID "102" is stored is provided in a general affairs department and an IC tag 40 in which the IC tag ID "103" is stored is provided in a business department. At this time, when a user possesses the mobile device 200 in which the device number "CCC" is stored is within the general affairs department, the user can use the mobile device 200 by using the phone number "333-3333". When the user is within the business department, the user can use the mobile device 200 by using the phone number "666-6666".

Figure 11:
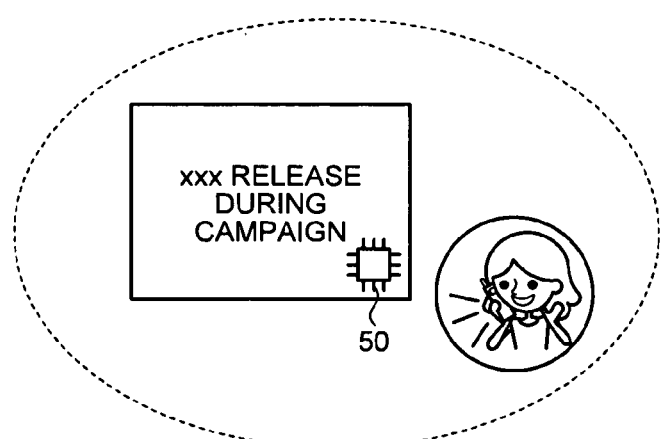
FIG. 11 is an explanation diagram explaining an example of providing a phone number to unspecified number of users.

FIG. 11 is an explanation diagram explaining an example for providing a phone number to unspecified number of users. In an example of FIG. 11, a company provides on a poster an IC tag 50 that can modify a phone number under device free. Therefore, if the owner of mobile device approaches the poster, the phone number of the mobile device is modified to a phone number of which a call charge is borne by the company. In this way, an added value that is obtained by making a call charge free when the owner speaks over the phone in front of the poster can be added, and thus an effect of attracting guests can be increased.

The present embodiment has been described about the case where a phone number is modified when the mobile device 200 falls within a range in which the mobile device can communicate with an IC tag. However, the present invention is not limited to this. The present invention can have a configuration that the mobile device 200 causes the display unit 220 to display the phone number of a call partner and the user can speak over the phone by clicking a call button when the mobile device 200 falls within a range in which the mobile device can communicate with the IC tag.

Moreover, the present embodiment has been described about the case where a phone number is modified when the mobile device 200 falls within a range in which the mobile device can communicate with an IC tag and the phone number stored in a temporary phone number is deleted when the mobile device 200 is taken outside the range in which the mobile device can communicate with the IC tag. However, the present invention is not limited to this. The present invention can have a configuration that a phone number is modified only when the mobile device 200 receives an IC tag ID from the IC tag without deleting the phone number stored in the temporary phone number even if the mobile device 200 is taken outside the range in which the mobile device can communicate with the IC tag. As illustrated in FIG. 1, when a phone number is modified to the phone number "333-3333" by using an IC tag 10, the phone number is not modified as it is "333-3333" even if the mobile device 200 is taken outside a range in which the mobile device can communicate with the IC tag 10.

Moreover, the present embodiment has been described about the case where an IC tag is used. However, the present invention is not limited to this. The IC tag can be replaced by anything if the replaced one can store information that can be uniquely identified. For example, the present invention can have a configuration that the mobile device 200 includes a bar code reading unit and the bar code reading unit reads a bar code identifier from a bar code provided at a predetermined place.

As described above, according to an embodiment, the phone number of a mobile device can be modified to a phone number that is not previously set in the mobile device. In other words, when a different phone number is newly used, the phone number can be modified to a new phone number without setting the new phone number in the mobile device.

According to an embodiment, communication can be performed by using a temporary phone number that can be modified only when a mobile device is located within a range that can communicate with an IC tag.

According to an embodiment, communication can be performed by using a basic phone number that cannot be modified when a mobile device is located outside a range that can communicate with an IC tag.

According to an embodiment, the phone number of a mobile device can be managed on a predetermined management apparatus.

According to an embodiment, a phone number can be modified on an unspecified mobile device.

According to an embodiment, the phone numbers of different mobile devices can be prevented from being modified to the same phone number.

According to an embodiment, a call-enabled call charge by using a phone number modified by the present invention can be managed in the unit of phone number.

According to an embodiment, a call-enabled call charge by using a phone number modified by the present invention can be managed in the unit of IC tag ID.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A mobile device that stores a device number for uniquely identifying the mobile device and is capable of communicating with a management apparatus that stores a phone number after modification in association with a combination of an identification number for uniquely identifying an IC (Integrated Circuit) tag and the device number, the mobile device comprising:
    a device information storage unit that previously stores a phone number;
    a communication control unit that performs communication control by using the phone number stored in the device information storage unit;
    an IC tag reading unit that reads the identification number from the IC tag;
    a phone-number-acquisition requesting unit that transmits a phone number acquisition request including the identification number read by the IC tag reading unit and the device number of the mobile device to the management apparatus; and
    a phone number modifying unit that modifies the phone number stored in the device information storage unit to a phone number after modification included in modification information received as a response to the phone number acquisition request.

2. The mobile device according to claim 1, wherein
    the device information storage unit stores a basic phone number that cannot be modified and a temporary phone number that can be modified,
    the phone number modifying unit modifies the temporary phone number stored in the device information storage unit to the phone number after modification included in the modification information received from the management apparatus, and
    the communication control unit performs, when a temporary phone number is stored in the device information storage unit, communication control by using the temporary phone number and performs, when a temporary phone number is not stored in the device information storage unit, communication control by using the basic phone number.

3. The mobile device according to claim 2, wherein the phone number modifying unit deletes the temporary phone number stored in the device information storage unit when the identification number is not received from the IC tag reading unit for a certain period.

4. A management apparatus capable of communicating with a mobile device that reads an identification number for uniquely identifying an IC tag (Integrated Circuit) from the IC tag provided at a predetermined place, the management apparatus comprising:
    a phone number management storage unit that previously stores a phone number after modification in association with a combination of the identification number and a device number for uniquely identifying the mobile device;
    a phone number specifying unit that specifies, when receiving a phone number acquisition request including the identification number and the device number, a phone number after modification corresponding to the combination of the identification number and the device number included in the phone number acquisition request from the phone number management storage unit; and
    a phone number informing unit that informs the mobile device of modification information including the phone number after modification specified by the phone number specifying unit.

5. The management apparatus according to claim 4, wherein
    the phone number management storage unit stores a plurality of phone numbers after modification in association with the identification number, and
    the phone number specifying unit acquires phone numbers after modification corresponding to the identification number included in the phone number acquisition request from the phone number management storage unit and specifies one phone number from the acquired phone numbers after modification.

6. The management apparatus according to claim 5, wherein
    the phone number management storage unit further stores an already-paid flag indicating whether a phone number after modification is used, and the phone number specifying unit specifies a phone number after modification that corresponds to the identification number included in the phone number acquisition request from the phone number management storage unit and indicates that the already-paid flag is unpaid.

7. The management apparatus according to claim 4, further comprising:
a billing information storage unit that previously stores a charged amount charged for each phone number in association with the phone number;
a charged-amount-upper-limit storage unit that previously stores a charged-amount upper limit indicative of an upper-limit money amount of the charged amount in association with the phone number; and
a billed amount verifying unit that compares the charged amount and the charged-amount upper limit, wherein
the phone number specifying unit specifies the phone number after modification when the charged amount is smaller than the charged-amount upper limit by virtue of the billed amount verifying unit.

8. The management apparatus according to claim 4, further comprising:
a billing information storage unit that previously stores a charged amount charged for each phone number in association with the phone number;
a charged-amount-upper-limit storage unit that previously stores a charged-amount upper limit indicative of an upper-limit money amount of the charged amount in association with the identification number; and
a billed amount verifying unit that acquires charged amounts corresponding to the identification number included in the phone number acquisition request from the billing information storage unit and compares a sum value of the acquired charged amounts and the charged-amount upper limit, wherein
the phone number specifying unit specifies the phone number after modification when the sum value of the charged amounts is smaller than the charged-amount upper limit by virtue of the billed amount verifying unit.

9. A phone number modifying system, comprising:
a mobile device that stores a device number for uniquely identifying the mobile device; and
a management apparatus that can communicate with the mobile device, wherein
the mobile device comprises
a device information storage unit that previously stores a phone number;
a communication control unit that performs communication control by using the phone number stored in the device information storage unit;
an IC tag reading unit that reads an identification number for uniquely identifying an IC tag (Integrated Circuit) from the IC tag;
a phone-number-acquisition requesting unit that transmits a phone number acquisition request including the identification number read by the IC tag reading unit and the device number of the mobile device to the management apparatus; and
a phone number modifying unit that modifies the phone number stored in the device information storage unit to a phone number after modification included in modification information received as a response to the phone number acquisition request, and
the management apparatus comprises
a phone number management storage unit that previously stores a phone number after modification in association with a combination of the identification number and the device number;
a phone number specifying unit that specifies, when receiving the phone number acquisition request from the mobile device, a phone number after modification corresponding to the combination of the identification number and the device number included in the phone number acquisition request from the phone number management storage unit; and
a phone number informing unit that informs the mobile device of modification information including the phone number after modification specified by the phone number specifying unit.

10. The phone number modifying system according to claim 9, wherein
the phone number management storage unit stores a plurality of phone numbers after modification in association with the identification number, and
the phone number specifying unit acquires phone numbers after modification corresponding to the identification number included in the phone number acquisition request from the phone number management storage unit and specifies one phone number from the acquired phone numbers after modification.

11. The management apparatus according to claim 10, wherein
the phone number management storage unit further stores an already-paid flag indicating whether a phone number after modification is used, and
the phone number specifying unit specifies a phone number after modification that corresponds to the identification number included in the phone number acquisition request from the phone number management storage unit and indicates that the already-paid flag is unpaid.

12. The phone number modifying system according to claim 9, further comprising:
a billing information storage unit that previously stores a charged amount charged for each phone number in association with the phone number;
a charged-amount-upper-limit storage unit that previously stores a charged-amount upper limit indicative of an upper-limit money amount of the charged amount in association with the phone number; and
a billed amount verifying unit that compares the charged amount and the charged-amount upper limit, wherein
the phone number specifying unit specifies the phone number after modification when the charged amount is smaller than the charged-amount upper limit by virtue of the billed amount verifying unit.

13. The phone number modifying system according to claim 9, further comprising:
a billing information storage unit that previously stores a charged amount charged for each phone number in association with the phone number;
a charged-amount-upper-limit storage unit that previously stores a charged-amount upper limit indicative of an upper-limit money amount of the charged amount in association with the identification number; and
a billed amount verifying unit that acquires charged amounts corresponding to the identification number included in the phone number acquisition request from the billing information storage unit and compares a sum value of the acquired charged amounts and the charged-amount upper limit, wherein the phone number specifying unit specifies the phone number after modification when the sum value of the charged amounts is smaller than the charged-amount upper limit by virtue of the billed amount verifying unit.

14. A control circuit that stores a phone number and a device number for uniquely identifying a mobile device, reads an identification number for uniquely identifying an IC tag (Integrated Circuit) from the IC tag, and controls the mobile device that communicates with a management apparatus that stores a phone number after modification in association with a combination of the identification number and the device number, the control circuit comprising:

a communication control unit that performs communication control by using the phone number;

a phone-number-acquisition requesting unit that transmits a phone number acquisition request including the identification number read from the IC tag and the device number of the mobile device to the management apparatus; and a phone number modifying unit that modifies the phone number to a phone number after modification included in modification information received as a response to the phone number acquisition request.

15. The control circuit according to claim 14, wherein the mobile device stores a basic phone number that cannot be modified and a temporary phone number that can be modified, the phone number modifying unit modifies the temporary phone number stored in the mobile device to the phone number after modification included in the modification information received from the management apparatus, and the communication control unit performs, when a temporary phone number is stored in the mobile device, communication control by using the temporary phone number and performs, when a temporary phone number is not stored in the mobile device, communication control by using the basic phone number.

16. The control circuit according to claim 15, wherein the phone number modifying unit deletes the temporary phone number stored in the mobile device when not receiving the identification number for a certain period.

\* \* \* \* \*

UNITED STATES PATENT AND TRADEMARK OFFICE
CERTIFICATE OF CORRECTION

| | | |
|---|---|---|
| PATENT NO. | : 8,275,409 B2 | |
| APPLICATION NO. | : 12/656189 | |
| DATED | : September 25, 2012 | |
| INVENTOR(S) | : Kazuhiro Sato et al. | |

It is certified that error appears in the above-identified patent and that said Letters Patent is hereby corrected as shown below:

In the Claims:

Column 14, Line 33, In Claim 4, delete "IC tag (Integrated Circuit)" and insert -- IC (Integrated Circuit) tag --, therefor.

Column 15, Line 54 (Approx.), In Claim 9, delete "IC tag (Integrated Circuit)" and insert -- IC (Integrated Circuit) tag --, therefor.

Column 17, Line 7-8 (Approx.), In Claim 14, delete "IC tag (Integrated Circuit)" and insert -- IC (Integrated Circuit) tag --, therefor.

Signed and Sealed this
Eighteenth Day of December, 2012

David J. Kappos
*Director of the United States Patent and Trademark Office*